United States Patent Office 3,391,110
Patented July 2, 1968

3,391,110
POLYMERIZABLE BENZOPHENONE UV ABSORBER-CONDENSATION POLYMERS
Ralph A. Coleman, Middlesex, N.J., assignor to American Cyanamid Company, New York, N.Y., a corporation of Maine
No Drawing. Filed Aug. 21, 1961, Ser. No. 132,586
4 Claims. (Cl. 260—47)

This invention relates to the stabilization of polymeric materials against the deteriorating effects of ultraviolet light.

More particularly, this invention relates to the stabilization of synthetic polymeric compositions from the deteriorative effects of ultraviolet light by the incorporation therein of a member of the class of compounds represented by the following Formula I:

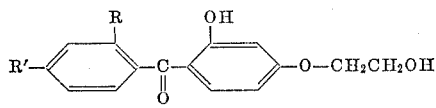

wherein R is either hydrogen or hydroxyl and R' is hydrogen or β-hydroxyethoxy.

A good ultraviolet absorber for use in polymeric materials should absorb the ultraviolet in daylight and at the same time be a colorless material by visual observation. The compound should impart no color to the composition, should be sufficiently stable to withstand the conditions of curing of the polymer, and should absorb ultraviolet light sufficiently to protect the composition against yellowing and decomposition on exposure to ultraviolet light. The compound must have sufficient solubility in various types of materials so that it may be easily incorporated into various plastic formulations, and once incorporated into the resin compositions, it should be capable of withstanding leaching action of solvents or loss by exudation.

Generally, an effective ultraviolet absorber should have its peak absorption above a wave length of 320 millimicrons. The absorption peak may be at a higher wave length, as long as the absorption drops off sufficiently as it approaches the visual range so that no color is visible. In addition, to be effective, it should show a high degree of absorbency in the desired wave length range especially at those wave lengths sufficiently below the visual range so that the compound has no yellow color visually.

Various compounds have heretofore been known for the stabilization of polymeric materials against deterioration by ultraviolet light. They have been deficient in one or more qualities which the ideal ultraviolet absorber must possess, especially with respect to the ability to become firmly incorporated in the polymeric material to be stabilized. This invention is based on the discovery that the members of a particular class of compounds are eminently suitable as ultraviolet absorbers especially for the stabilization of synthetic polymers containing reactive carboxyl groups.

It is an object of this invention to provide, as a new class of ultraviolet stabilized modified resins, esters of a 2-hydroxy-4-β-hydroxyethoxybenzophenone of this invention with a polymeric material containing reactive carboxyl groups, or functional equivalents thereof such as carboxylic halide groups.

Other objects of this invention will be made apparent hereinafter.

It is an advantage of the present invention that the compounds of Formula I can be used as chemically bonded modifiers in the stabilization of the various polymeric materials.

The compounds of Formula I are particularly useful when employed as chemically bonded ultraviolet absorbers for the protection of those resinous copolymers and interpolymers made from monomeric substances having reactive carboxyl groups. The ultraviolet absorbers of this invention when thus used are bonded to the resin through the ester forming group of the 4 or 4' position of the benzophenone nucleus and the carboxyl group of the polymeric material. In being capable of being chemically bonded to the resinous polymer, they are not subject to leaching by solvent action or loss by exudation during the molding or film forming process, as the case may be, and thus provided a high degree of permanent stabilization against ultraviolet light.

When used to modify the carboxylic resinous polymers the stabilizers of this invention are added to the various polymerizable mixes before complete polymerization and polymerization is then affected by known methods. Generally depending on desired properties and intended use from about 0.1 to about 10.0% of the ultraviolet absorbers based on the final weight of the resinous composition may be employed.

Among the suitable carboxylic polymeric materials which can thus be protected are the following:

(1) "Alkyd resins," i.e., those resins which are formed by the condensation of polyhydric alcohols with resinifying carboxylic organic acids or anhydrides thereof, with or without additional modifiers such as resin acid, or other acid modifiers such as abietic acid, fatty acids, such as a vegetable fatty acid (e.g., ADM vegetable acid 520 composed of 6% palmetic acid, 4% stearic acid, 22% oleic acid, 17% linoleic acid and 51% linolenic acid) and drying oils. Suitable acidic components for the preparation of alkyd resins are phthalic anhydride or maleic anhydride along with varying amounts of modifying substances such as citric, malic, tartaric, azeleic, succinic, adipic, sebacic, pimelic and/or 1,8-naphthalic acids. Suitable polyhydric compounds are dihydric alcohols such as ethylene glycol, propylene glycol and diethylene glycol or trihydric alcohols such as glycerol. Alkyd resins are further disclosed in U.S. 2,087,952; 1,950,468 and 1,860,164;

(2) "Polyester resins" i.e., resins formed by the polycondensation of dicarboxylic acids with dihydroxy alcohols, optionally containing varying amounts of monocarboxylic acids, monohydroxy alcohols, and even small amounts of polycarboxylic acids and polyhydroxy alcohols;

(3) "Polyurethane resins," i.e., resins having reoccurring aminoformic ester units i.e., urethane groups. They are usually derived from polyisocyanates reacted with compounds containing active hydrogens such as hydroxy terminated polyesters. Examples of the most commonly used isocyanates are toluene-2,4-diisocyanate, methylene-bis-4-phenylisocyanate, naphthlene-1,5-diisocyanate, tritolyl-methane-triisocyanate, 3,3'-bitolylene-4,4'-diisocyanate, phenyl isocyanate, hexamethylene diisocyanate, naphthyl isocyanate, and 2,3,5,6-tetramethyl-1,4-benzene diisocyanate.

The compounds of Formula I are conveniently prepared by reaction of a compound of the Formula II:

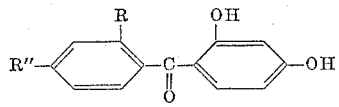

wherein R" is hydrogen or hydroxyl and R is as hereinbefore defined with ethylene chlorohydrin. The reaction is usually conducted in an aqueous medium in the presence of a hydrogen acceptor such as an alkali metal carbonate. When R" is hydrogen, equimolar amounts of reactants may be employed. When R" is hydroxyl, the use of two moles of chlorohydrin per mole of the hydroxy-benzophenone derivative will yield the 4,4'-di-β-hydroxyethoxy derivative.

The following examples in which parts are on a weight basis, are presented for the purpose of further illustrating this invention.

Example 1

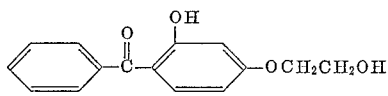

21.4 g. of 2,4-dihydroxybenzophenone and 4.0 g. of sodium hydroxide were dissolved in 125 ml. of water. 8.1 g. of ethylene chlorohydrin were added all at once to the above solution and the mixture was stirred at 90–95° C. for 4 hours, and allowed to stand overnight at room temperature. A tacky solid was obtained and recrystallized from acetonitrile giving off white crystals, M.P. about 92–94.5° C.

Calc'd for $C_{15}H_{14}O_4$: C, 69.7%; H, 5.46%. Found: C, 69.72; H, 5.68%.

Example 2

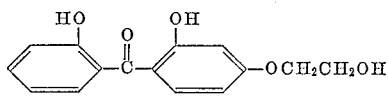

23.0 g. of 2,2',4-trihydroxybenzophenone, 4.0 g. sodium hydroxide, 8.1 g. ethylene chlorohydrin and 150 ml. of water were heated for 4 hours at 90–95° C., and allowed to come to room temperature overnight. The gum which formed was crystallized from alcohol to give the product.

Example 3

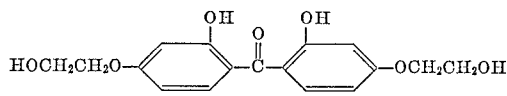

24.6 g. of 2,2',4,4'-tetrahydroxybenzophenone, 13.1 g. of 85.6% pure KOH, 16.2 g. of ethylene chlorohydrin and 150 cc. of water were heated at reflux for 3½ hours, then allowed to cool overnight. A brown gum formed, which on two recrystallizations from toluene, gave a yellow solid melting at about 136–138° C.

Example 4

A mixture of the following is prepared:

| | Parts |
|---|---|
| Phthalic anhydride | 19.2 |
| Glycerol | 12.3 |
| Linseed fatty acid | 44.0 |
| 4,4'-di(β-hydroxyethoxy)-2,2'-dihydroxybenzophenone | 8.0 |
| Xylene | 7.7 |

The mixture is heated to about 190° C. at which point a vigorous reaction occurs. After heating at this temperature for seven hours, 40 parts of xylene is added. The xylene is then stripped off and the resin is diluted with 43.5 parts of hydrocarbon solvent (Varsol I). (Analysis shows 61.7% solids and an acid number of 5.48.) The ultraviolet absorption spectrum of this composition shows it to have high absorbency in the ultraviolet range and extremely low absorbency in the visible light range.

A similar preparation without the UV absorber was made as a control. An ultraviolet absorption curve run on the control sample showed considerably less absorption in the ultraviolet range than by the sample having the UV absorber.

A glass slide was coated with the UV stabilized polyester resin above prepared. The thickness of the film was determined to be less than 1.0 mil. A transmission curve of this film showed complete absorption below 370 millimicrons, but transmission of practically all visible light. The ultraviolet absorber was not extracted from the plastic coating by soaking in 95% alcohol for 100 hours.

EXAMPLE 5

A polyester resin is prepared by coreacting 22.2 parts of phthalic anhydride, 17.1 parts of fumaric acid, 24.8 parts of propylene glycol and 0.25 part of 4-(β-hydroxyethoxy)-2-hydroxybenzophenone. When esterification is substantially complete, as indicated by an acid number of about 30–40, there is added styrene in a sufficient amount to equal one-half of the polyester resin. The syrup containing 0.50% benzoyl peroxide is poured into a glass mold (lubricated) and then heated for 30 minutes at 80° C., plus 30 minutes at 105° C., plus 60 minutes at 120° C. The resulting sheet (⅛" thick) is cut into 2" x 2" squares for exposure tests along with a polyester sample without the benzophenone. It is found the latter yellows much more rapidly when exposed in the Fade-Ometer.

EXAMPLE 6

A hydroxyl-terminated polyester is prepared by agitating 199 parts of epsilon-caprolactone with 11 parts of ethylene glycol and 3 parts of 4,4'-di-(β-hydroxyethoxy)-2,2'-dihydroxybenzophenone for 20 hours at 170° C. To this is added 49.5 parts of toluene-2,4-diisocyanate and stirred at 80° C. for 2 hours in a dry reaction flask protected from atmospheric moisture. The mixture is then cast onto a flat glass surface and cured at room temperature for one week.

The above film was soaked in ethanol for 100 hours but showed no evidence of loss of absorber during this time indicating that the absorber is chemically bonded to the resin.

I claim:
1. A modified resinous composition of matter which is stable against the deteriorative effects of ultraviolet light comprising an ester prepared by condensation of a compound of the formula:

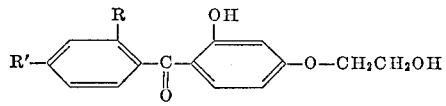

wherein R is a member selected from the group consisting of hydrogen, hydroxy and R' is a member selected from the group consisting of hydrogen and β-hydroxyethoxy with a polyhydric alcohol and a polycarboxylic acid.

2. A modified ester resinous composition of matter according to claim 1 wherein the ester moiety of the composition is hydroxy terminated resulting from the employment of a stoichiometric excess of the polyhydric alcohol reactant in the preparation thereof.

3. A modified polyurethane resinous composition of matter prepared by further reacting the hydroxy terminated ester of claim 2 with an isocyanate or diisocyanate.

4. A modified polyurethane composition according to claim 3 wherein the hydroxy terminated ester has been further reacted with an aromatic diisocyanate.

References Cited
UNITED STATES PATENTS

| | | | |
|---|---|---|---|
| 3,264,236 | 8/1966 | Santaniello | 260—22 |
| 3,308,095 | 3/1967 | Maerov | 260—47 |
| 2,962,533 | 11/1960 | Hardy et al. | 260—45.95 |
| 2,976,259 | 3/1961 | Hardy et al. | 260—45.95 |
| 3,086,988 | 4/1963 | Gordon | 260—591 |
| 3,094,506 | 6/1963 | Weinberg et al. | 260—591 |
| 3,200,086 | 8/1965 | Coleman | 260—591 |
| 2,853,521 | 9/1958 | Hardy et al. | 260—45.95 |

DONALD E. CZAJA, *Primary Examiner.*

MILTON STERMAN, LEON J. BERCOVITZ,
*Examiners.*

J. W. BEHRINGER, R. W. GRIFFIN,
*Assistant Examiners.*